United States Patent [19] [15] 3,682,973
Eriksoo et al. [45] Aug. 8, 1972

[54] BENZODIOXOLE COMPOUNDS OF THERAPEUTIC INTEREST

[72] Inventors: Edgar Eriksoo; Hans Jacob Fex; Knut Bertil Hogberg; Henri Rene Mollberg, all of Halsingborg; Oskar Adolf Rohte, Raa, all of Sweden

[73] Assignee: Aktiebolaget Leo (AB Leo), Halsovagen, Halsingborg, Sweden

[22] Filed: June 24, 1969

[21] Appl. No.: 836,142

[52] U.S. Cl. .........260/340.5, 260/247.7, 260/294.7, 260/326.5, 424/278
[51] Int. Cl. ............................................C07d 13/10
[58] Field of Search...................................260/340.5

[56] References Cited

UNITED STATES PATENTS 2,545,439  3/1951  Allen et al. .............260/340.5

Primary Examiner—Alex Mazel
Assistant Examiner—James H. Turnipseed
Attorney—Gordon W. Hueschen and Hueschen and Kurlandsky

[57] ABSTRACT

This invention relates to benzodioxole compounds having valuable pharmacological properties and to the preparation thereof. The invention is also concerned with pharmaceutical compositions containing the said compounds, and method of treatment therewith.

45 Claims, No Drawings

BENZODIOXOLE COMPOUNDS OF THERAPEUTIC INTEREST

The symbols occurring below are defined when first used and have the same definition throughout this description.

With lower alkyl or lower alkoxy is understood alkyl or alkoxy groups containing up to four carbon atoms.

In accordance with the present invention there is provided benzodioxole compound of the general formula:

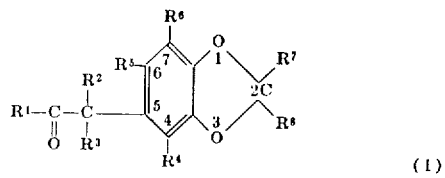

(I)

wherein $R^1$ is an amino, alkylamino, dialkylamino, morpholino, piperidino, pyrrolidino or dialkylamino alkylamino group or a group of the formula $OR^9$ wherein $R^9$ is a hydrogen atom, a lower alkyl group or a pharmaceutically acceptable inorganic or organic cation, $R^2$ and $R^3$ are the same or different and each is a hydrogen atom or a lower alkyl group, $R^4$, $R^5$ and $R^6$ are the same or different and each is a hydrogen, fluorine or chlorine atom or a trifluoromethyl ($CF_3$), nitro ($NO_2$) or hydroxy group or a lower alkyl or lower alkoxy group, $R^7$ is hydrogen or a lower alkyl group, $R^8$ is an alkyl, alkenyl or cycloalkyl group containing two to eight carbon atoms, optionally substituted with a substituent selected from the group consisting of Cl, OH and lower alkoxy or an aryl group optionally substituted with not more than three equal or different substituents selected from the group consisting of F, Cl, $CF_3$, $NO_2$, OH, lower alkyl and lower alkoxy or $R^8$ forms together with $R^7$ and the carbon atom in the 2-position of the benzodioxole ring a cycloaliphatic ring containing up to seven carbon atoms.

The compounds of general Formula (I) which have one or more asymmetric carbon atoms may exist in different possible stereoisomeric forms and the present invention includes such stereoisomers and also the racemates of such compounds.

The compounds of this invention have valuable antiinflammatory, analgesic, and antipyretic properties. The present invention also provides such antiinflammatory, analgesic, and antipyretic pharmaceutical compositions, containing a benzodioxole compound of general Formula (I) in admixture with a pharmacologically acceptable carrier.

The pharmacological properties of the compounds of this invention vary according to the position and nature of the individual substituents and they compare favorably with such known antiinflammatory agents as acetyl salicylic acid, phenylbutazone and indometacin.

Those compounds of the general Formula (I) where $R^2$ represents H and $R^3$ represents H or $CH_3$ show especially high activity in pharmacological tests which indicate antiinflammatory activity. Such higher degree of activity is also shown by compounds wherein $R^7$ stands for H or $CH_3$.

The compounds of the invention can be administered for disorders responsive to treatment with antiinflammatory agents as such or admixed with a pharmacologically acceptable solid or liquid carrier or diluent and they may be made available in varying amounts in such pharmaceutical forms as tablets, capsules, powders and aqueous or non-aqueous suspensions and solutions.

The compounds of the invention are effective in pharmacological tests generally used for the determination of antiinflammatory activity [aerosil-edema test as described by Th. Wagner-Jauregg et. al. Helv. Physiol. Acta 21, 65 (1963), carrageenin-edema test as described by C. A. Winter et. al. Proc. Soc. Exp. Biol. Med. 111 544–47 (1962)], analgetic activity [writhing test as described by R. Koster et al. Fed. Proc. 18, 412 (1959)] and antipyretic activity [yeast fever test in rats as described by C. A. Winter in Non-steroidal Anti-inflammatory Drugs (S. Garattini and M. N. Dukes Eds) p. 190, Excerpta Medica Foundation 1965].

The present invention also provides a process for the preparation of a compound of general Formula (I) herein, which comprises treating a carbonyl compound of the general formula:

(II)

or a reactive derivative derived therefrom with a dihydroxy compound of the general formula:

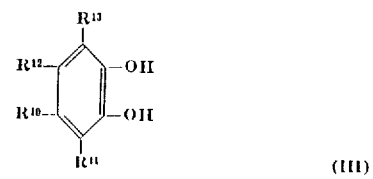

(III)

or a derivative derived therefrom, wherein $R^{10}$, $R^{11}$, $R^{12}$ and $R^{13}$ represent

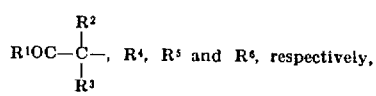

$R^4$, $R^5$ and $R^6$, respectively, or groups which can be converted thereto by known methods, to obtain a compound of the general formula:

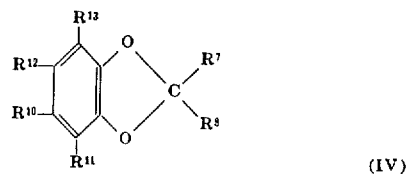

(IV)

whereafter, if necessary, the groups $R^{10}$, $R^{11}$, $R^{12}$ and $R^{13}$ are converted by conventional methods to

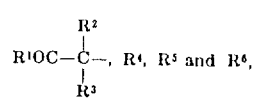

$R^4$, $R^5$ and $R^6$, respectively, in such a manner that each group of the compound involved is compatible with the process in question and protected if necessary, so that a compound of the general Formula (I) is obtained.

As a reactive derivative derived from the carbonyl compound of Formula (II) an acetal of a lower aliphatic alcohol or a gem-dichloride or a gem-dibromide may be used. Also enol ethers with a lower aliphatic alcohol of those carbonyl compounds of the general Formula (II) which can exist in enol-form may be used as such reactive derivatives.

As a reactive derivative derived from the dihydroxy compound of Formula (III) cyclic sulphurous or carbonic ester may be used.

If a carbonyl compound of the general Formula (II) itself or an acetal or an enolether derived therefrom is used in the reaction with a dihydroxy compound of the general Formula (III) or a reactive derivative thereof the process may suitably be carried out in the presence of a conventional acetalization catalyst such as sulphuric, phosphoric, polyphosphoric, hydrochloric or trifluoroacetic acid, pyridine hydrochloride, calcium chloride or an aliphatic or aromatic sulphonic acid or phosphoric anhydride or an ion exchanger carrying sulphonic acid groups.

The process is preferably carried out at a temperature between 0° C. and the boiling point of the reaction mixture in an inert solvent such as a hydrocarbon, chlorinated hydrocarbon, ether or ester. The carbonyl compound of Formula (II) itself or the reactive derivative thereof may be used as the solvent.

If the reactive derivative derived from the carbonyl compound of the general Formula (II) is the corresponding gem-dichloride or gem-dibromide the reaction is preferably carried out in the presence of a hydrogen ion acceptor such as a hydroxide, carbonate, or hydrogen carbonate of an alkali metal or alkaline earth metal or a tertiary amine.

A compound of the general Formula (IV) may be converted into another compound of the same general formula. Thus the groups $R^7$ and $R^8$ may be transposed by transacetalization in a conventional way.

Also compounds of the general formula:

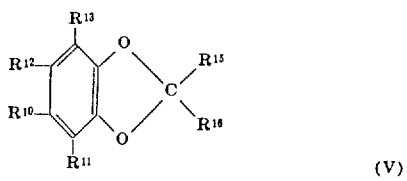

(V)

wherein $R^{15}$ represents H or $CH_3$ when $R^{16}$ is $CH_3$ or both $R^{15}$ and $R^{16}$ represent aryl groups, can be converted to a compound of the general Formula (IV) by transacetalization with a carbonyl compound of the general Formula (II) in the presence of an acetalization catalyst.

The group $R^{10}$ mentioned may be an intermediate atom or group which by conventional methods can be converted to

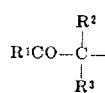

Such an atom or atom group may be a hydrogen or halogen atom or an acetyl, carboxyl and derivatives, aldehyde or derivatives or a group of the formula

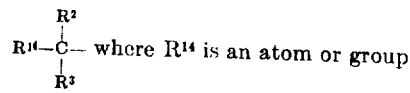

where $R^{14}$ is an atom or group which can be transformed into $R^1$ CO by known methods, such as a halogen atom or a hydroxy, cyanide, aldehyde or derivatives.

Compounds of the general Formula (I) which contain asymmetric carbon atoms if desired be resolved into their stereoisomers by conventional methods, such as fractional crystallization of the compounds of Formula (I) where $R^1$ is an —OH group, in the form of salts with optically active bases. Such stereoisomers may also be prepared by using optically active intermediates in the synthesis.

The following examples illustrate the present invention.

EXAMPLE 1

To a mixture consisting of 10 mg of methyl-α-methyl(3,4-dihydroxyphenyl)-acetate, 6.6 g of 3-pentanone and 50 ml of toluene are added 7.25 g of phosphorous pentaoxide in one portion while stirring vigorously. The reaction mixture is refluxed for 1 hour, and then cooled to room temperature. The solution containing the product is decanted off and passed through a short column of activated alumina and then evaporated to dryness in vacuo to give a residue of methyl-α-methyl-(2,2-diethyl-1,3-benzodioxole)-5-acetate as an oil (b.p. 115°–135° C. at 0.7 mm). The crude ester is hydrolyzed with 100 ml of 2 molar potassium hydroxide in methanol by refluxing for 1.5 hours.

The α-methyl-(2,2-diethyl-1,3-benzodioxole)-5-acetic acid crystallizes as morpholine salt, m.p. 81.5° C.

The procedure of Example 1 is used for the preparation of: 2,2-diethyl-1,3-benzodioxole-5-actic acid, m.p. 77°–8 C.;

2-ethyl-2-methyl-1,3-benzodioxole-5-acetic acid (ethanolamine salt m.p. 104° C.);

spiro /1,3-benzodioxole-2,1'-cyclopentane/-5-acetic acid (ethanolamine salt, m.p. 108° C.);

spiro /1,3-benzodioxole-2,1' cyclohexane/-5-acetic acid, m.p. 88° C.;

2-methyl-2-tert. butyl-1,3-benzodioxole-5-acetic acid, m.p. 88° C.;

2-methyl-2-phenyl-1,3-benzodioxole-5-acetic acid (morpholine salt, m.p. 110° C.);

2-phenyl-1,3-benzodioxole-5-acetic acid, m.p. 117° C.;

2-isopropyl-1,3-benzodioxole-5-acetic acid, m.p. 70° C.;

2-isopropyl-2-methyl-1,3-benzodioxole-5-acetic acid (morpholine salt, m.p. 102° C.);

2-methyl-2-propyl-1,3-benzodioxole-5-acetic acid (morpholine salt, m.p. 82° C.);

2-isobutyl-2-methyl-1,3-benzodioxole-5-acetic acid (morpholine salt, m.p. 95° C.);

2-butyl-2-methyl-1,3-benzodioxole-5-acetic acid (morpholine salt, m.p. 90° C.);

2,2-dipropyl-1,3-benzodioxole-5-acetic acid (morpholine salt, m.p. 62° C.);

α-methyl-/2-ethyl-2-methyl-1,3-benzodioxole/-5-acetic acid, m.p. 77.5° C.;

α-methyl-/2-isopropyl-2-methyl-1,3-benzodioxole/-5-acetic acid (morpholine salt, m.p. 112°–112.5° C);

α-methyl-/2-methyl-2-propyl-1,3-benzodioxole/-5-acetic acid (morpholine salt, m.p. 104°–104.5° C.);

α-methyl-/2-hexyl-2-methyl-1,3-benzodioxole/-5-acetic acid (morpholine salt, m.p. 87.5°–88° C.);

α-methyl-spiro /1,3-benzodioxole-2,1'-cyclohexane/-5-acetic acid, m.p. 113°–14.5° C;

α-methyl-(2-methyl-2-phenyl-1,3-benzodioxole)-acetic acid (morpholine salt, m.p. 132°–4° C.);

2-(4-methoxyphenyl)-1,3-benzodioxole-5-acetic acid (morpholine salt, m.p. 83° C.);

2-(2-methoxyphenyl)-2-methyl-1,3-benzodioxole-5-acetic acid (morpholine salt, m.p. 92° C.);

2-(4-methoxyphenyl)-2-methyl-1,3-benzodioxole-5-acetic acid (morpholine salt, m.p. 107° C.);

2-(3,4-methylendioxyphenyl)-2-methyl-1,3-benzodioxole-5-acetic acid (morpholine salt, m.p. 108° C.);

2-(4-chlorophenyl)-2-methyl-1,3-benzodioxole-5-acetic acid (morpholine salt, m.p. 108°–110° C.);

α,α-dimethyl-(2,2-diethyl-1,3-benzodioxole)-5-acetic acid (morpholine salt, m.p. 73° C.);

2-ethyl-2-phenyl-1,3-benzodioxole-5-acetic acid (morpholine salt, m.p. 96° C.);

2,2-diphenyl-1,3-benzodioxole-5-acetic acid (morpholine salt, m.p. 120° C.);

2-(2-n-butyl)-2-methyl-1,3-benzodioxole-5-acetic acid (morpholine salt, m.p. 97° C.);

2-(3-n-pentyl)-2-methyl-1,3-benzodioxole-5-acetic acid (morpholine salt m.p. 103° C.);

2-cyclohexyl-2-ethyl-1,3-benzodioxole-5-acetic acid (morpholine salt, m.p. 89°–90° C.);

2-n-propyl-2-phenyl-1,3-benzodioxole-5-acetic acid (morpholine salt, m.p. 96° C.);

2-(3-chlorophenyl)-1,3-benzodioxole-5-acetic acid (morpholine salt, m.p. 85° C.);

2-methyl-2-(3,4,5-trimethoxyphenyl)-1,3-benzodioxole-5-acetic acid (morpholine salt, m.p. 84° C.);

2-(4-chlorophenyl)-1,3-benzodioxole-5-acetic acid (morpholine salt, m.p. 115° C.);

2-(2-chlorophenyl)-1,3-benzodioxole-5-acetic acid (morpholine salt, m.p. 104° C.);

2-(3-methoxyphenyl)-1,3-benzodioxole-5-acetic acid (morpholine salt, m.p. 94° C.);

2-(2-methoxyphenyl)-1,3-benzodioxole-5-acetic acid (morpholine salt, m.p. 110° C.);

2-dimethyl-(3-methoxyphenyl)-2-methyl-1,3-benzodioxole-5-acetic acid (morpholine salt, m.p. 89° C.);

2-(2,6-dichlorophenyl)-1,3-benzodioxole-5-acetic acid (morpholine salt, m.p. 100° C.);

2-(3,4-dimethoxyphenyl)-1,3-benzodioxole-5-acetic acid (morpholine salt, m.p. 112

2-(4-toly)-1,3-benzodioxole-5-acetic acid (Morpholine salt, m.p. 118° C.);

2-(3,4-methylendioxyphenyl)-1,3-benzodioxole-5-acetic acid, m.p. 108° C.;

2-cyclopropyl-2-methyl-1,3-benzodioxole-5-acetic acid (morpholine salt, m.p. 85° C.);

2,2-diethyl-6-chloro-1,3-benzodioxole-5-acetic acid, m.p. 95° C.;

2-isopropyl-2-methyl-6-chloro-1,3-benzodioxole-5-acetic acid, m.p. 118° C.;

α,α-dimethyl-(2-isopropyl-2-methyl-1,3-benzodioxole)-5-acetic acid (morpholine salt, m.p. 82° C.);

α,α-dimethyl-(2-methyl-2-phenyl-1,3-benzodioxole)-5-acetic acid (morpholine salt, m.p. 101°–3° C.);

α,α-dimethyl-(2-phenyl-1,3-benzodioxole)-5-acetic acid (morpholine salt, m.p. 103°–4° C.);

2-ethyl-2-methyl-7-chloro-1,3-benzodioxole-5-acetic acid, m.p. 117.5°–118° C.;

2-methyl-2-phenyl-7-chloro-1,3-benzodioxole-5-acetic acid (morpholine salt, m.p. 118°–119° C.);

α-ethyl-(2-butyl-2-methyl-1,3-benzodioxole)-5-acetic acid, sodium salt;

7-fluoro-2-ethyl-2-methyl-1,3-benzodioxole-5-acetic acid, sodium salt;

7-nitro-2,2-diethyl-1,3-benzodioxole-5-acetic acid, sodium salt;

7-trifluoromethyl-2-ethyl-2-methyl-1,3-benzodioxole-5-acetic acid, sodium salt;

2-(2-hydroxyethyl)-2-methyl-1,3-benzodioxole-5-acetic acid, sodium salt;

2-(2-methoxy-n-butyl)-2-methyl-1,3-benzodioxole-5-acetic acid, calcium salt;

2-propenyl-1,3-benzodioxole-5-acetic acid, calcium salt; and 2-(2-chloropropyl)-2-methyl-1,3-benzodioxole-5-acetic acid, calcium salt.

EXAMPLE 2

A mixture consisting of 13.6 parts of benzodioxole-2-one (pyrocatecholcarbonate), 9.8 parts of cyclohexanone is refluxed until no more carbon dioxide is evolved. The residue is distilled in vacuo to give spiro (1,3-benzodioxole-2,1'-cyclohexane). B.p. 116°–119° C.; m.p. 97° C.

To 19.4 parts of spiro (1,3-benzodioxole-2,1'-cyclohexane) are then added 20.4 parts of acetic anhydride. After cooling in ice-bath 28.2 parts of a boron trifluoride-acetic acid complex ($BF_3 \cdot (CH_3COOH)_2$) are added while stirring. The stirring is continued for 30 minutes in the ice-bath and then for 90 minutes at room temperature.

The reaction mixture is then poured in an excess of saturated aqueous sodium acetate solution, and then extracted with ether. The ethereal extract is treated with activated carbon, dried over anhydrous sodium sulphate and distilled in vacuo to give spiro (5-acetyl-1,3-benzodioxole-2,1'-cyclohexane). B.p. 192°–3°C.; m.p. 52° C.

(Willgerodt rearrangement) A mixture consisting of 11.1 g of spiro (5-acetyl-1,3-benzodioxole-2,1'-cyclohexane), 2.6 g of amorphus sulphur and 7.3 g of morpholine is refluxed for 10 hours. The reaction mixture is poured into 30 ml of absolute ethanol, whereafter the morpholide of spiro (1,3-benzodioxole-2,1'-cyclohexane)-5-thioacetic acid crystallizes and is filtered off. The product so obtained is then hydrolyzed by refluxing in 200 ml of a solution of 5 percent sodium hydroxide in 50 percent ethanol for 10 hours. The reaction mixture is then acidified and extracted with ether, treated with activated carbon and evaporated to dryness in vacuo. The residue is crystallized from hexane to yield the spiro (1,3-benzodioxole-2,1'-cyclohexane)-5-acetic acid, m.p. 88° C.

EXAMPLE 3

A mixture consisting of 36.4 g of methyl-3,4-dihydroxy-phenylacetate, 29.4 g of cyclohexanone, 0.2 g of p-toluenesulphonic acid and 200 ml of xylene is refluxed with a water separator until the calculated amount of water is collected. The reaction mixture is then extracted with an aqueous solution of sodium hydroxide and evaporated to dryness in vacuo to yield methyl spiro (1,3-benzodioxole-2,1'-cyclohexane)-5-acetate as an oil.

EXAMPLE 4

A mixture consisting of 15.0 parts of 2,2-dimethyl-1,3-benzodioxole, 14.7 parts of cyclohexanone, 100 parts of toluene and 2 parts of p-toluene-sulphonic acid is distilled slowly at atmospheric pressure until all acetone formed has passed over. The reaction mixture is cooled to room temperature, washed with aqueous sodium hydrogen carbonate solution, dried over anhydrous sodium sulphate and distilled in vacuo to give 1,3-benzodioxole-2,1'-cyclohexane, b.p. 116°–119° at 11 mm.

EXAMPLE 5

Ten parts of 2-ethyl-2-methyl-1,3-benzodioxole-5-acetic acid are dissolved in 50 parts of methanol and 0.05 parts of concentrated sulphuric acid are added.
The reaction mixture is refluxed for 30 minutes and then cooled to room temperature.
The reaction mixture is then dissolved in ether, washed with aqueous sodium hydrogen carbonate solution. The ethereal solution is dried with anhydrous sodium sulphate and then evaporated to dryness. The residue is distilled in vacuo to give methyl-(2-ethyl-2-methyl-1,3-benzodioxole)-5-acetate, $bp_{0.2}$ 108.5°–109° C. oil.

The same procedure may be used for the preparation of the following compounds:

isopropyl-(2-ethyl-2-methyl-1,3-benzodioxole)-5-acetate, oil, $bp_{0.3}$ 143° C.

n-butyl-(2-ethyl-2-methyl-1,3-benzodioxole)-5-acetate, oil, $bp_{0.2}$ 190°–2° C.

EXAMPLE 6

Ten parts of 2-ethyl-2-methyl-1,3-benzodioxole-5-acetyl chloride are dissolved in 100 parts of anhydrous ether and shaken with 100 parts of concentrated ammonia.

The ethereal phase is separated, washed with water, dried over anhydrous sodium sulphate and evaporated to dryness in vacuo.

The residue is crystallized from ether-petroleum ether to give 2-ethyl-2-methyl-1,3-benzodioxole-5-acetamide, m.p. 90°–91° C.

The same procedure is used for the preparation of N-(2-ethyl-2-methyl-1,3-benzodioxole-5-acetyl)-morpholin, oil.

EXAMPLE 7

100,000 tablets of 200 mg each:
2,2-diethyl-1,3-benzodioxole-5-
acetic acid
Lactose                         20,000 g
Starch                           5,850 g
Gelatin                          2,000 g
Glycerol                           350 g
Distilled water q.s.
Talc                               150 g
Magnesium stearate               1,500 g
                                   150 g The 2,2-diethyl-1,3-benzodioxole-5-acetic acid, lactose and starch are mixed together and screened. The gelatin and glycerol are dissolved in a suitable amount of water and added to said mixture, which is then granulated. The granulate obtained is then dried and mixed with the talc and the magnesiumstearate, whereafter tablets are made.

EXAMPLE 8

100,000 tablets of 100 mg each:
β-methyl-(2-ethyl-methyl-1,3-benzodioxole)-
5-acetic acid, ethanolamine salt
Lactose                         10,000 g
Starch                           6,400 g
Gelatin                          2,150 g
Glycerol                           250 g
Distilled water q.s.
Talc                               100 g
Magnesium stearate               1000 g
                                   100 g The same procedure as in the Example 7 is followed.

EXAMPLE 9

Aqueous solution for injection:
α-methyl-(2-ethyl-2-methyl-1,3-
benzodioxole)-5-acetic acid, ethanolamine
salt                              500 mg
Sterilized water to make           10 ml Where the processes of the foregoing examples produce a compound having a methyl or other alkyl group, it is to be understood that compounds containing other alkyl groups of straight or branched nature and containing up to four carbon atoms inclusive, such as methyl, ethyl, propyl, isopropyl, butyl, sec.-butyl, or t.-butyl are prepared in the same manner by substitution in the process of the appropriate different alkyl starting material. Similarly, where a methoxy or other alkoxy group is present, compounds having other alkoxy groups containing various alkyl groups having up to four carbon atoms inclusive are prepared in the same manner from the appropriate different alkoxy starting material. Similarly, other molecular changes within the scope of the invention are readily made.

The compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in any one of various ways, for example, orally as in capsules or tablets, or parenterally in the form of sterile solutions, suspensions, or by pellet implantation, and in some cases intravenously in the form of sterile solutions. Other modes of administration are cutaneously, subcutaneously, buccally, intramuscularly, and intraperitoneally.

As representative of living animal bodies which may be treated with the compounds and compositions of the invention for alleviation of the same and/or similar conditions as those described, in addition to human beings may be mentioned the following: domestic animals such as dogs and cats, and farm animals such as horses, cows, sheep, and goats.

Pharmaceutical formulations are usually prepared from a predetermined quantity of one or more of the compounds of the invention, preferably in solid form. Such formulations may take the form of powders, elixirs, solutions, pills, capsules, pellets or tablets, with or without, but preferably with, any one of a large variety of pharmaceutically acceptable vehicles or carriers. When in admixture with a pharmaceutical vehicle or carrier, the active ingredient usually comprises from 0.01 to 75 percent, preferably from 0.1 to 15 percent, by weight of the composition. Carriers such as starch, sugar, talc, commonly used synthetic and natural gums or water, may be used in such compositions. Binders such as gelatine, and lubricants such as sodium stearate, may be used to form tablets. Disintegrating agents such as sodium bicarbonate may also be included in tablets.

Although relatively small quantities of the active compounds of the invention, even as low as 5.0 milligram, may be used in cases of administration to subjects having a relatively low body weight, unit dosages are preferably 5 milligrams or above and preferably 25, 50, or 100 milligrams, or even higher, depending of course upon the subject treated and the particular result desired, as will be apparent to one skilled in the art. Broader ranges are 1 to 3,000 milligrams per unit dose. The active compounds of the invention may be admixed for administration with other pharmacologically active agents, such as analgesics, tranquillizers, steroids or hormones, or with buffers or antacids, and the proportion of the active agent or agents in the compositions may be varied widely. It is only necessary that the active ingredient of the invention should constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well-established medical and/or veterinary principles. As a rule, however, when used therapeutically in human beings, the compounds of the present invention may be administered in a quantity of 25 to 5,000 milligrams per day and patient, divided in 1 to 4 doses, during a period of 1 day to 1 year.

We claim:
1. A compound of the formula:

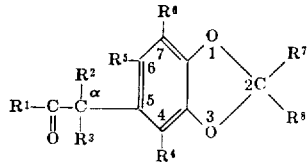

wherein
R$^1$ is amino, loweralkylamino, diloweralkylamino, or diloweralkylamino loweralkylamino or OR$^9$ wherein R$^9$ is hydrogen, lower alkyl, or a pharmaceutically acceptable inorganic or organic cation, R$^2$ and R$^3$ are the same or different and each is hydrogen or lower alkyl, R$^4$, R$^5$ and R$^6$ are the same or different and each is hydrogen, fluorine, chlorine, trifluoromethyl, nitro, hydroxy, lower alkyl, or lower alkoxy, R$^7$ is hydrogen, phenyl, or lower alkyl, R$^8$ is alkyl or alkenyl containing two to eight carbon atoms, inclusive, or cycloalkyl containing three to eight carbon atoms, inclusive, said alkyl or cycloalkyl being optionally substituted with a substituent selected from the group consisting of Cl, OH, and lower alkoxy, or phenyl optionally substituted with not more than three substituents selected from the group consisting of F, Cl, CF$_3$, NO$_2$, OH, lower alkyl, lower alkoxy, and methylenedioxy.

2. A compound of claim 1 wherein R$^2$ and R$^3$ are H.
3. A compound of claim 1 wherein R$^2$ is H and R$^3$ is CH$_3$.
4. A compound of claim 1, wherein R$^7$ is methyl.
5. A compound of claim 1, wherein R$^7$ is methyl and R$^8$ is phenyl optionally substituted with not more than three substituents selected from the group consisting of F, Cl, CF$_3$, NO$_2$, OH, lower alkyl and lower alkoxy.
6. A compound of claim 1, wherein R$^4$ and R$^5$ are H and R$^6$ is F, Cl, CF$_3$, CH$_3$, or OCH$_3$.
7. A compound of claim 1 of the formula:

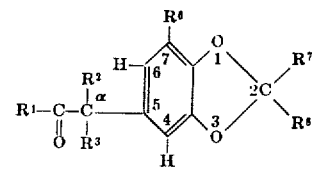

wherein
R$^1$ is OR$^9$ wherein R$^9$ is hydrogen, lower-alkyl, or a pharmaceutically acceptable inorganic or organic cation, R$^2$ and R$^3$ are the same or different and each is hydrogen or methyl, R$^6$ is fluorine, chlorine, trifluoromethyl, methyl, or methoxy, R$^7$ is lower-alkyl or H, R$^8$ is alkyl or alkenyl containing two to eight carbon atoms inclusive, cycoalkyl containing three to eight carbon atoms in the ring, or said alkyl or cycloalkyl having a substituent selected from the group consisting of Cl, OH, and lower-alkoxy.

8. A compound of claim 1 which is α-methyl-(2,2-diethyl-1,3-benzodioxole)-5-acetic acid.
9. A compound of claim 1 which is methyl-α-methyl-(2,2-diethyl-1,3-benzodioxole)-5-acetate.
10. A compound of claim 1 which is 2,2-diethyl-1,3-benzodioxole-5-acetic acid.
11. A compound of claim 1 which is 2-ethyl-2-methyl-1,3-benzodioxole-5-acetic acid.
12. A compound of claim 1 which is 2-methyl-2-tert. butyl-1,3-benzodioxole-5-acetic acid.
13. A compound of claim 1 which is 2-isopropyl-2-methyl-1,3-benzodioxole-5-acetic acid.
14. A compound of claim 1 which is 2-methyl-2-propyl-1,3-benzodioxole-5-acetic acid.
15. A compound of claim 1 which is 2-isobutyl-2-methyl-1,3-benzodioxole-5-acetic acid.
16. A compound of claim 1 which is 2-butyl-2-methyl-1,3-benzodioxole-5-acetic acid.
17. A compound of claim 1 which is 2,2-dipropyl-1,3-benzodioxole-5-acetic acid.
18. A compound of claim 1 which is α-methyl-/2-ethyl-2-methyl-1,3-benzodioxole/-5-acetic acid.
19. A compound of claim 1 which is α-methyl-/2-isopropyl-2-methyl-1,3-benzodioxole/-5-acetic acid.
20. A compound of claim 1 which is α-methyl-/2-methyl-2-propyl-1,3-benzodioxole/-5-acetic acid.
21. A compound of claim 1 which is α-methyl-/2-hexyl-2-methyl-1,3-benzodioxole/-5-acetic acid.

22. A compound of claim 1 which is α,α-dimethyl-(2,2-diethyl-1,3-benzodioxole)-5-acetic acid.

23. A compound of claim 1 which is 2-(2-n-butyl)-2-methyl-1,3-benzodioxole-5-acetic acid.

24. A compound of claim 1 which is 2-(3-n-pentyl)-2-methyl-1,3-benzodioxole-5-acetic acid.

25. A compound of claim 1 which is 2-cyclohexyl-2-ethyl-1,3-benzodioxole-5-acetic acid.

26. A compound of claim 1 which is 2-cyclopropyl-2-methyl-1,3-benzodioxole-5-acetic acid.

27. A compound of claim 1 which is 2,2-diethyl-6-chloro-1,3-benzodioxole-5-acetic acid.

28. A compound of claim 1 which is α,α-dimethyl-(2-isopropyl-2-methyl-1,3-benzodioxole)-5-acetic acid.

29. A compound of claim 1 which is 2-ethyl-2-methyl-7-chloro-1,3-benzodioxole-5-acetic acid.

30. A compound of claim 1 which is 7-fluoro-2-ethyl-2-methyl-1,3-benzodioxole-5-acetic acid.

31. A compound of claim 1 which is 7-nitro-2,2-diethyl-1,3-benzodioxole-5-acetic acid.

32. A compound of claim 1 which is 7-trifluoromethyl-2-ethyl-2-methyl-1,3-benzodioxole-5-acetic acid.

33. A compound of claim 1 which is 2-(2-hydroxyethyl)-2-methyl-1,3-benzodioxole-5-acetic acid.

34. A compound of claim 1 which is 2-(2-methoxy-n-butyl)-2-methyl-1,3-benzodioxole-5-acetic acid.

35. A compound of claim 1 which is 2-(2-chloropropyl)-2-methyl-1,3-benzodioxole-5-acetic acid.

36. A compound of claim 1 which is methyl-(2-ethyl-2-methyl-1,3-benzodioxole)-5-acetate.

37. A compound of claim 1 which is isopropyl-(2-ethyl-2-methyl-1,3-benzodioxole)-5-acetate.

38. A compound of claim 1 which is n-butyl-(2-ethyl-2-methyl-1,3-benzodioxole)-5-acetate.

39. A compound of claim 1 which is lower-alkyl-(2-ethyl-2-methyl-1,3-benzodioxole)-5-acetate.

40. A compound of claim 1 which is a 2-lower-alkyl-6-chloro compound.

41. A compound of claim 1 which is a 2-lower-alkyl-7-chloro compound.

42. A compound of claim 1 which is a 2-lower-alkyl-7-fluoro compound.

43. A compound of claim 1 which is 2-isopropyl-1,3-benzodioxole-5-acetic acid.

44. A compound of claim 1 which is alpha-ethyl-2-butyl-2-methyl-1,-3-benzodioxole-5-acetic acid.

45. A compound of claim 1 which is 2-propenyl-1,3-benzodioxole-5-acetic acid.

* * * * *

UNITED STATES PATENT OFFICE
CERTIFICATE OF CORRECTION

Patent No. 3 682 973  Dated 8 August 1972

Inventor(s) Edgar Eriksoo et al.

It is certified that error appears in the above-identified patent and that said Letters Patent are hereby corrected as shown below:

Col. 1, lines 11-17    (General Formula I)
Page 1, lines 13-17    ("α" was omitted)

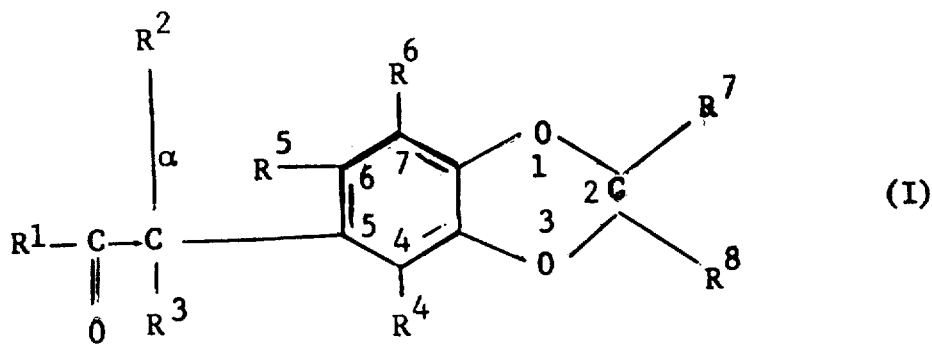

Col. 5, line 49      "2-dimethyl-(3- ..."
Page 9, line 12      -- 2-(3- ... --

Col. 5, line 56      "2-(4-toly)- ..."
Page 9, line 18      -- 2-(4-tolyl)- ... --

Col. 8, line 11 (Example 8)   "β-methyl ..."
Page 13, line 27              -- α-methyl ... --

Signed and sealed this 20th day of March 1973.

(SEAL)
Attest:

EDWARD M. FLETCHER, JR.          ROBERT GOTTSCHALK
Attesting Officer                 Commissioner of Patents